(12) United States Patent
Privitera et al.

(10) Patent No.: US 10,209,563 B2
(45) Date of Patent: Feb. 19, 2019

(54) NON-BLACK DEAD FRONT DISPLAY ASSEMBLY

(71) Applicant: Google Inc., Mountain View, CA (US)

(72) Inventors: Peter Privitera, San Francisco, CA (US); Matthew Scott, San Jose, CA (US); Giancarlo Giustina, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 15/232,503

(22) Filed: Aug. 9, 2016

(65) Prior Publication Data

US 2017/0329182 A1    Nov. 16, 2017

Related U.S. Application Data

(60) Provisional application No. 62/335,594, filed on May 12, 2016.

(51) Int. Cl.
*G02F 1/1333*    (2006.01)
*G02F 1/1335*    (2006.01)
*G02F 1/13357*   (2006.01)

(52) U.S. Cl.
CPC .. *G02F 1/133606* (2013.01); *G02F 1/133504* (2013.01); *G02F 1/133512* (2013.01); *G02F 1/1336* (2013.01); *G02F 2001/133331* (2013.01); *G02F 2001/133562* (2013.01)

(58) Field of Classification Search
None
See application file for complete search history.

(56) References Cited

U.S. PATENT DOCUMENTS

| 5,691,788 | A | 11/1997 | Kim et al. |
| 5,695,269 | A * | 12/1997 | Lippmann ............. B60K 35/00 362/23.01 |
| 6,534,163 | B1 | 3/2003 | Takatsu |
| 8,319,926 | B2 | 11/2012 | Shoraku et al. |
| 8,467,177 | B2 | 6/2013 | Mathew et al. |
| 8,659,829 | B2 | 2/2014 | Walker et al. |
| 8,792,069 | B2 | 7/2014 | Hyytiainen et al. |
| 8,967,834 | B2 | 3/2015 | Timmerman et al. |

(Continued)

FOREIGN PATENT DOCUMENTS

| WO | WO-2007039863 A1 | 4/2007 |
| WO | WO-2013114162 A1 | 8/2013 |

OTHER PUBLICATIONS

Extended European Search Report dated Dec. 8, 2017 as received in Application No. 17170238.4.

*Primary Examiner* — Britt D Hanley
(74) *Attorney, Agent, or Firm* — Morris & Kamlay LLP

(57) ABSTRACT

A non-black dead front display assembly includes a display frame, a backlight system supported by the frame, the backlight system configured to generate backlight rays, a light mask disposed on the backlight system, a light mask disposed on the backlight system, the light mask configured to transmit or to block the backlight rays in response to a control signal, and a film positioned over the light mask, the film configured to reflect ambient light rays and to scatter the backlight rays transmitted through the light mask, the scattered backlight rays causing a first portion of the film to glow while a second portion of the film appears non-glowing.

21 Claims, 9 Drawing Sheets

(56) References Cited

U.S. PATENT DOCUMENTS

| | | | |
|---|---|---|---|
| 9,021,646 B2 * | 5/2015 | Nazaroff | A46B 15/0044 15/22.1 |
| 9,366,425 B2 * | 6/2016 | Teoh | F21K 9/65 |
| 9,372,505 B2 | 6/2016 | Mathew et al. | |
| 9,808,754 B2 * | 11/2017 | Stoner, Jr. | B01D 46/001 |
| 2002/0167637 A1 | 11/2002 | Burke et al. | |
| 2007/0053189 A1 | 3/2007 | Wang et al. | |
| 2013/0258213 A1 * | 10/2013 | Ek | G02F 1/1313 349/5 |
| 2013/0314642 A1 | 11/2013 | Timmerman et al. | |
| 2015/0042935 A1 | 2/2015 | Yamamoto et al. | |
| 2015/0360606 A1 * | 12/2015 | Thompson | B60Q 3/252 362/490 |

\* cited by examiner

NON-BLACK DEAD FRONT DISPLAY ASSEMBLY

CROSS-REFERENCE TO RELATED APPLICATIONS

This application claims priority to U.S. Provisional Application No. 62/335,594, filed May 12, 2016, the content of which is hereby incorporated by reference in its entirety.

BACKGROUND

Various products such as learning thermostats or security alarm panels have displays to show alphanumeric characters, icons, symbols, graphics, user interface elements, or the like. These displays, which are typically liquid crystal displays (LCDs), are naturally black in the off state. Most walls in homes, offices, or other indoor environments, however, are white or lightly colored, which means that such displays will stand out and thus not blend harmoniously with interior decoration.

BRIEF SUMMARY

According to an embodiment of the disclosed subject matter, a non-black dead front display assembly includes a display frame, a backlight system supported by the frame, the backlight system configured to generate a backlight illumination, a light mask disposed on the backlight system, the light mask configured to transmit or to block the backlight illumination in response to a control signal, and a film positioned over the light mask, the film configured to reflect an ambient light and to scatter the backlight illumination transmitted through the light mask, the scattered backlight illumination causing a first portion of the film to glow while a second portion of the film appears non-glowing.

According to an embodiment of the disclosed subject matter, a device comprises a sensor and a non-black dead front display assembly, which comprises a display frame, a backlight system supported by the frame, the backlight system configured to generate a backlight illumination, a light mask disposed on the backlight system, the light mask configured to transmit or to block the backlight illumination in response to a control signal, and a film positioned over the light mask, the film configured to reflect an ambient light and to scatter the backlight illumination transmitted through the light mask, the scattered backlight illumination causing a first portion of the film to glow while a second portion of the film appears non-glowing.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments or implementations of the disclosed subject matter, and together with the detailed description, serve to explain the principles of the disclosed subject matter. No attempt is made to show structural details in more detail than may be necessary for a fundamental understanding of the disclosed subject matter and various ways in which it may be practiced.

DETAILED DESCRIPTION

Dead fronting has been used in consumer products in an attempt to blend a display into a black or dark background. The dead front display is designed to prevent text, graphics, numbers, symbols, user interface elements, or the like, from being visible until they are illuminated by a light source. Accordingly, when the light source is off or not illuminating, a uniform black or nearly black background is visible. If the display is in an area where the background is not black or dark, for example, in an indoor environment such as a home or an office, the display may stand out and not blend harmoniously with the background.

Some conventional display products may include a light-emitting diode (LED) matrix on a printed circuit board (PCB) behind a white plastic housing to achieve a white or non-black dead front display effect. Although these products may provide a dead front display effect, the resolutions of the displays may be limited. Since LEDs are used, the spacing of LEDs may be limited by the overall size of the LED package, as well as the gaps between adjacent pixels on the white dead front display that may be used to achieve desirable performance. With these resolution constraints, it may not be feasible or even possible to show more than a few characters of alphanumeric characters, icons, symbols, user interface elements or the like on the display. Some display products may include grey instead of white plastic housing, or another color that achieves a non-black dead front display effect.

In accordance with an implementation of the present subject matter, a device includes a dead front display that is capable of achieving white, or more generally, non-black dead-fronted effects, such that text or graphics may be displayed as a glowing white region, that is, a region that displays as a brighter white than other regions of the display on top of a white front surface, for example. When the display is not actively displaying information, the display may present a uniform cosmetic surface, for example, a white or non-black surface, to a user. In some implementations, the graphics may be displayed as a glowing grey region, that is, a brighter shade of grey than other regions of the display on a grey front surface, for example.

Figure 1:
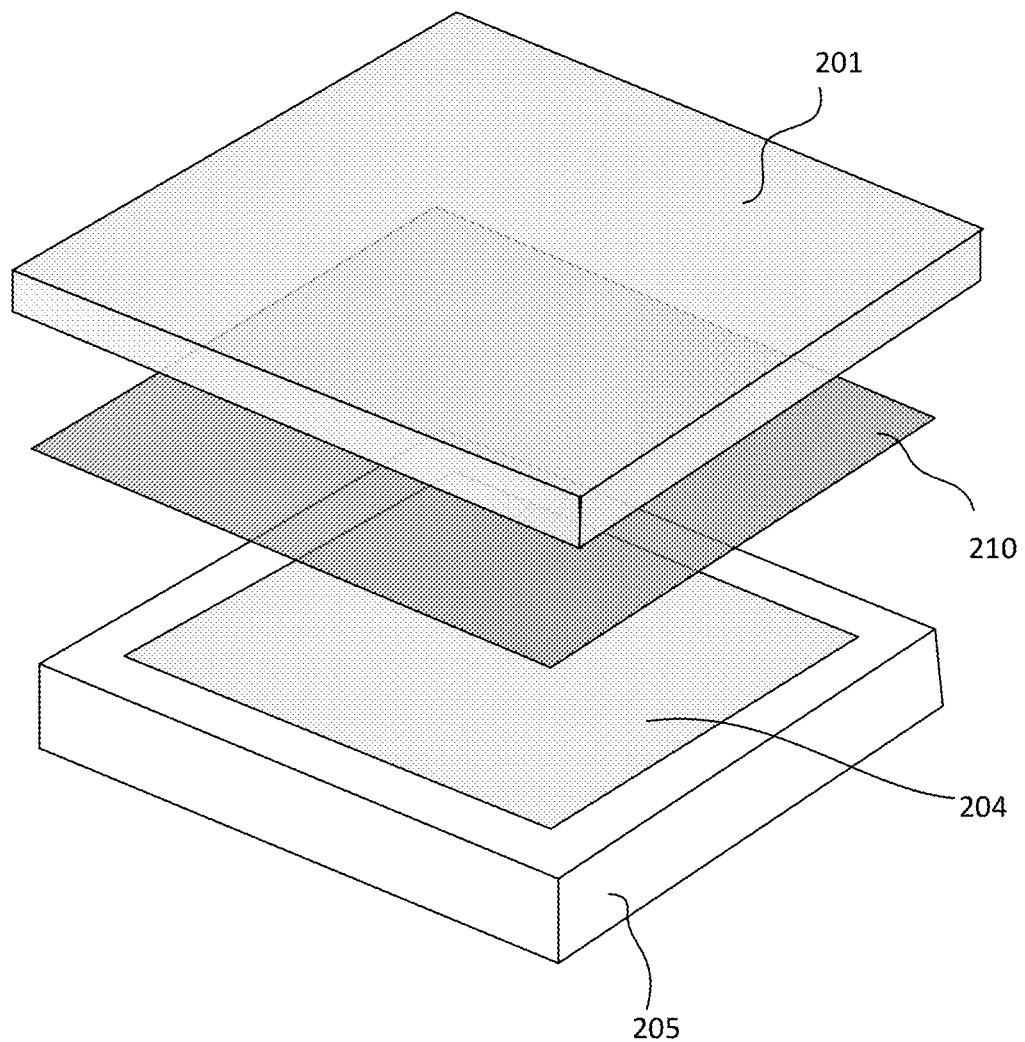
FIG. 1 shows in an example of an exploded view of elements of a display before assembly.
Figure 2:
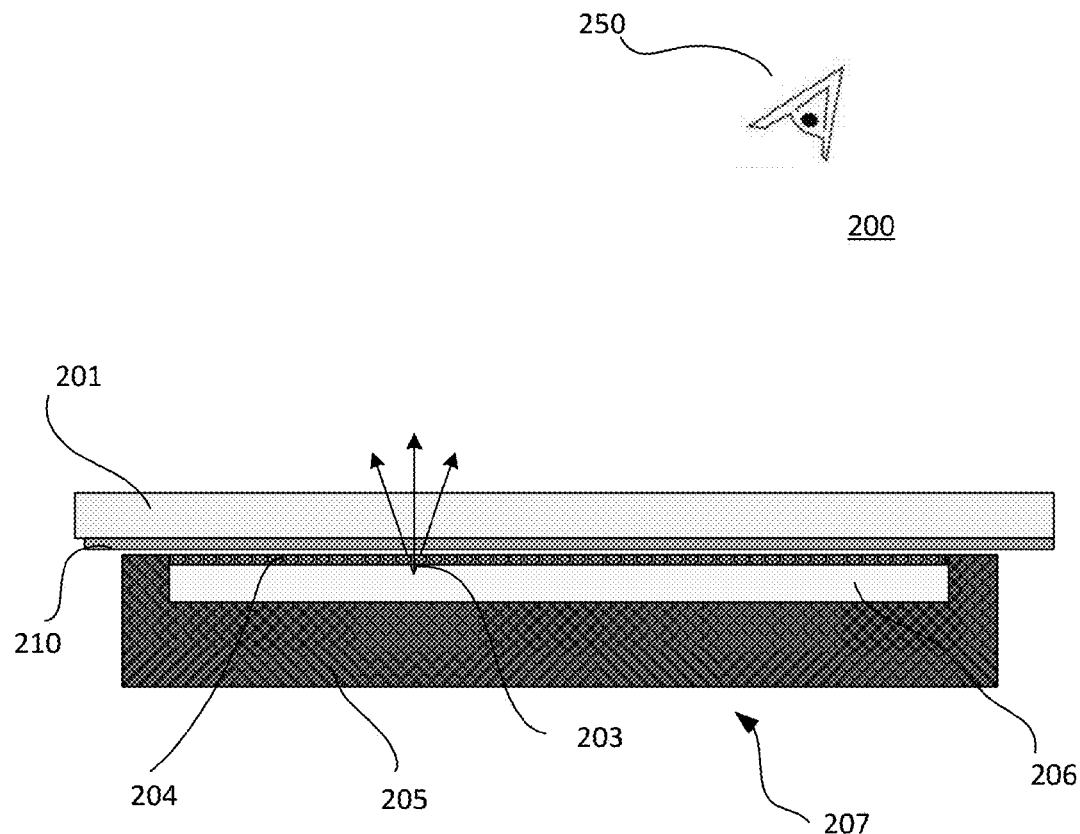
FIG. 2 shows an example of an assembled display of FIG. 1.

FIG. 1 shows an example of an exploded view of elements of a display before the elements are assembled. A display 200 includes a protective layer 201, a film layer 210, and a display frame 205. In some implementations, the film layer 210 may include a diffusion layer of a white, grey or light color. FIG. 2 shows an example of the assembled display of FIG. 1. In some implementations, the display frame 205 may include a backlight system 206 and a light mask 204. In the example shown in FIGS. 1 and 2, the light mask 204, which includes liquid crystal pixels, and the backlight system 206, are included as components of an LCD 207. In the example shown in FIG. 2, the backlight system 206 is recessed within the display frame 205, and the light mask 204 is positioned on top of the backlight system 206.

As illustrated in FIG. 2, the LCD 207 includes the backlight 206 and the light mask 204 which includes one or more liquid crystal pixels 203, which may be switched between transparent and opaque states in response to control signals. Although implementations of the disclosed subject matter are described with reference to a monochrome liquid crystal display (LCD), the presently disclosed subject matter may also be applicable to other types of displays, such as color LCDs, monochrome or color LEDs, or monochrome or color organic light emitting diode, (OLEDs). The monochrome LCD, though, may provide a contrast ratio between light pixels and dark pixels that is higher than that is found on a typical color display.

The backlight system 206 of the LCD 207 produces light rays normal to the backlight surface. The LCD 207 may include a liquid crystal array in which individual pixels may either block or transmit the incident backlight rays, that is, to appear either opaque black or transparent, in response to control signals. When an individual pixel is opaque black or substantially opaque black, no light or a minimal amount of light exits the display 200 from the backlight system 206 through that pixel. When the pixel is transparent or substantially transparent, the light from the backlight system 206 exits the display 200. In conventional displays, the light rays that exit the transparent or substantially transparent pixels would be directly visible to the user 250. As such, each liquid crystal pixel in effect acts as an active light mask for the backlight system 206.

As shown in FIG. 2, the backlight ray that exits from a turned-on transparent pixel 203 of the light mask 204 hits the film layer 210. The film 210 may be a layer of ink or film that is printed or laminated on the protective cover 201, a layer of white polyvinyl chloride (PVC), or a layer of white polytetrafluoroethylene (PTFE), for example. The film 210 provides a dead front effect, that is, when a pixel 203 in the LCD 207 is off and appears opaque black or nearly opaque black, the region of the film 210 above that pixel appears to a user as being white or nearly white because the film 210 reflects and diffuses external ambient light from above the protective layer 201. In some implementations, the film 210 also may serve to hide internal details, for example, the boundaries where the light mask 204 of the LCD 207 ends and the frame 205 of the LCD 207 starts.

Figure 3:
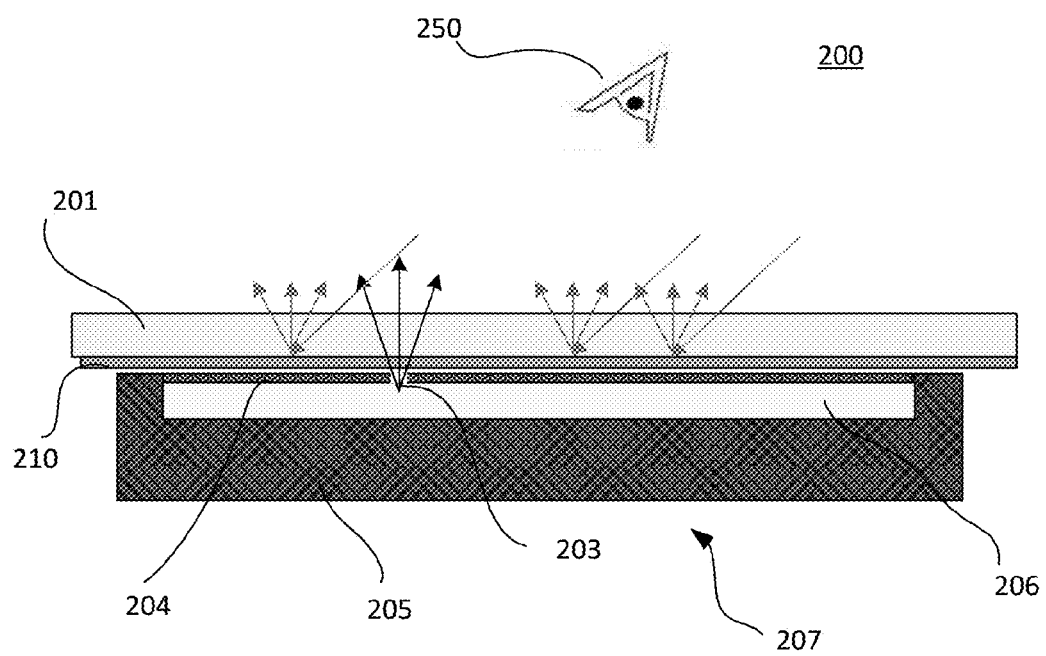
FIG. 3 shows an example of reflection of ambient light and scattering of transmitted backlight through the assembled display of FIG. 2.

An example of an illustration of the behavior of light in accordance with an implementation as seen by the user is shown in FIG. 3. When a pixel 203 in the LCD 207 is on, that is, when the pixel is clear and allows backlight rays to pass through, the backlight rays will hit the dead front film 210 and scatter in all directions. To the user 250, the light from the backlight system 206 appears to be as a glowing small portion of the film 210. For example, in the case of a white or substantially white film 210, the small portion of the film 210 may glow white, while the rest of the film 210 may appear to be a substantially uniform non-glowing white flat surface on which ambient light is reflected but no backlight is scattered. The LCD backlight that is transmitted and scattered from the film 210 is additive to the ambient light being reflected off the film 210. Instead of white or substantially white films, colored or grey films may also be used as dead front diffusion films that have sufficient contrast ratios between glowing regions and non-glowing regions of the films. In some implementations, the small portion of the film 210 through which the backlight is scattered may produce a glowing grey, that is, a brighter shade of grey, compared to the non-glowing regions of the film on which the ambient light is reflected but no backlight is scattered.

In order to reduce the blurriness of an image on the dead front display assembly as seen by a user, the film layer 210 may be made as thin as possible, for example, a thickness of less than 0.6 mm. In some implementations, the film layer 210 may be formed by using white ink printed onto a clear substrate, where the ink layer is facing the LCD 207, to provide a diffusion layer thickness on the order of 30 microns. With such a structure, the amount of scatter that a ray of backlight experiences as it travels through the material of the film layer 210 is reduced, thus resulting a corresponding reduction in the amount of spread that the light exhibits, both positional and angular, as it exits the film layer 210.

Figure 4:
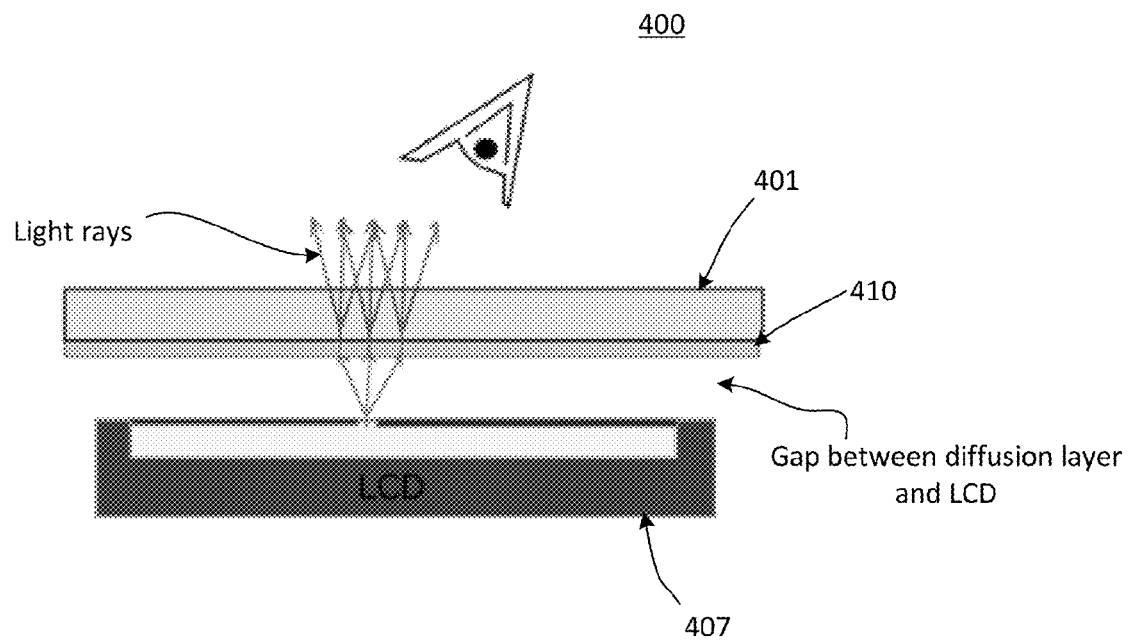
FIG. 4 shows an example of an illustration of a display assembly including a gap between a diffusion film and an LCD.

The distance between the LCD and the diffusion layer may have an impact on the sharpness of the image on the surface of the dead front display system. In an example of a display assembly 400 illustrated in FIG. 4, a space is provided between the LCD 407 and the diffusion layer 410, such that backlight rays exiting from the display have more distance to spread out before they hit the diffusion film. For example, if the backlight rays exit the LCD 407 within an angular range of −45 to +45 degrees, then the amount of additional image spread would be proportional to the distance between the LCD 407 and the diffusion film 410. FIG. 4 shows an implementation of the display assembly 400 which includes a relatively large gap between the diffusion film 410 and the LCD 407. A large gap between the diffusion film and the LCD may result in a blurry image as seen from above the protective layer 401. In contrast, if the LCD is close to or in direct contact with the diffusion film, the light is less likely to spread, as illustrated in FIG. 3, thus producing a clearer image.

Figure 5:
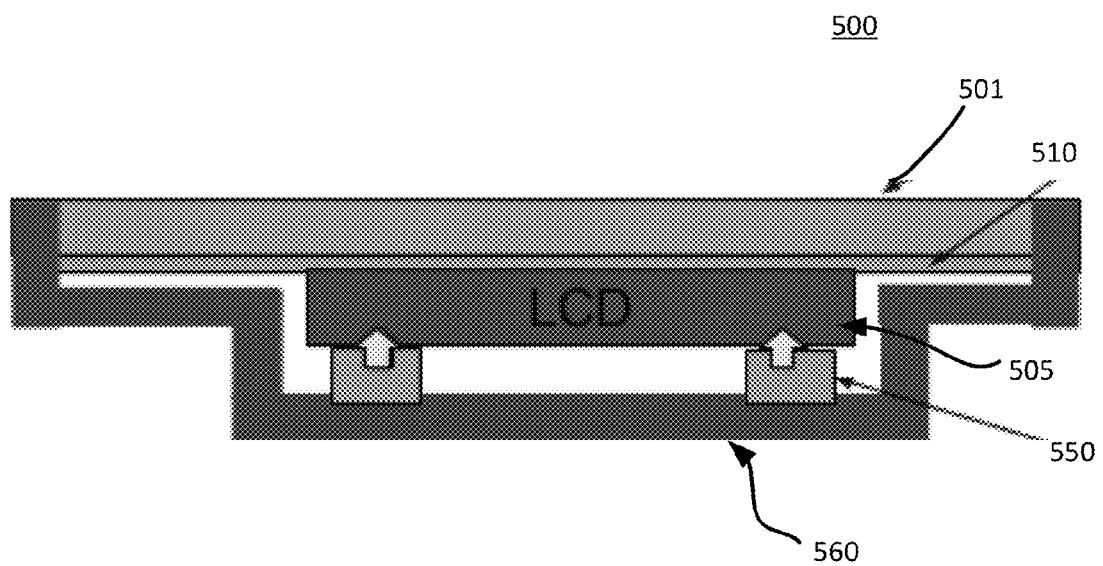
FIG. 5 shows an example of a display assembly in which the LCD is biased forward to reduce the distance from the diffusion film.

In some implementations, the LCD may be biased by a mechanical structure to cause the LCD to make direct contact with the diffusion film. FIG. 5 shows an example of a display assembly 500 in which the LCD 505 is biased upward to reduce or to eliminate the spacing between the LCD 505 and the diffusion film 510. In this implementation, foam or springs 550 on a fixed ledge 560 may be provided beneath the LCD 505 to push the LCD 505 directly against the diffusion film 510, which is supported by a rigid clear front lens 501 as a protective cover. This display assembly 500 allows for direct contact between the LCD and the diffusion film even when there is a thickness tolerance on the display and mechanical housing.

In some implementations such as the one shown in FIG. 2, the diffusion film or dead front film 210 may be positioned over the light mask 204. The film 210 does not have to be in direct contact with the light mask 204, however. In some implementations, the film 210 may be positioned close to the light mask 204 such that the light rays from the backlight system do not spread prior to hitting the film 210. As the separation between the film and the light mask increases, more distance is provided for the light rays from the backlight system to spread out before they hit the film 210. This spread may result in a fuzzier image with a reduced overall brightness as perceived by the user. In some implementations, the film may not be bound to the LCD display with an optical adhesive, because the adhesive may be visible to the human eye through the film.

Referring back to FIGS. 1 and 2, the film 210 may be applied to the protective cover 201. For example, a white ink film may be applied to the surface of the protective cover 201 that is facing the LCD 207. The film 210 may be laminated to the protective cover 201, for example. In some implementations, a clear protective cover may be used. The protective cover 201 may be formed of any material such as plastic, glass, ceramic, or some combination thereof. The protective cover 201 may be formed of a transparent material having a sufficient transmissivity which allows the passage of all, most, or at least some light. In some implementations, the protective cover may be formed of a material that allows substantially all colors of visible light to pass through it. In some implementations, the protective cover 201 may be formed from polymethyl methacrylate (PMMA), also known as acrylic glass. In some implementations, the protective cover 201 and the film 210 may be a part of a single layer. For example, the film 210 may be a layer of white PVC on the protective cover 201. Depending on the implementation, one or more separate covers may be used to protect the display from external elements.

Figure 6:
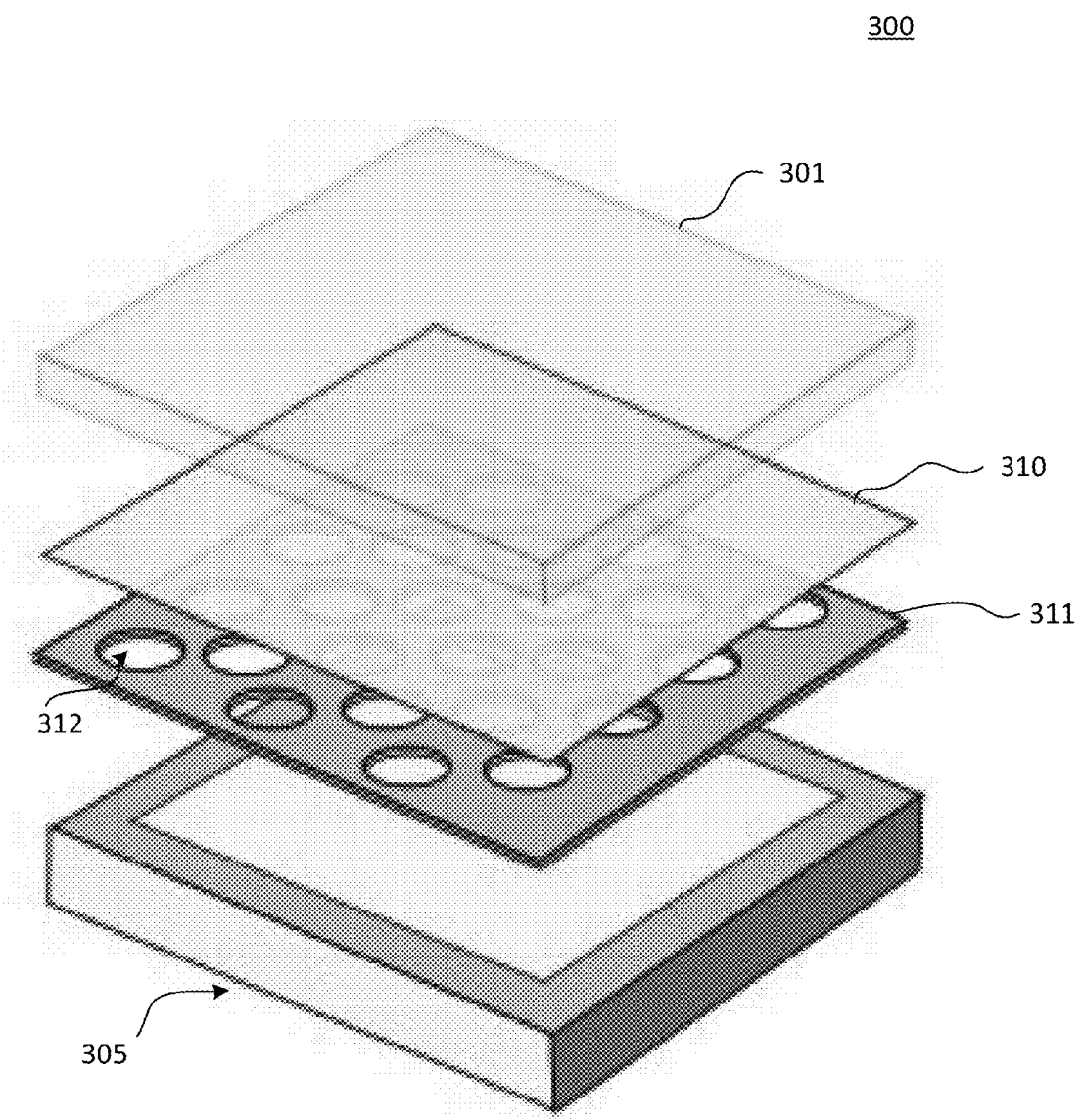
FIG. 6 shows an example of an exploded view of elements of a display including a perforated layer before assembly.
Figure 7:
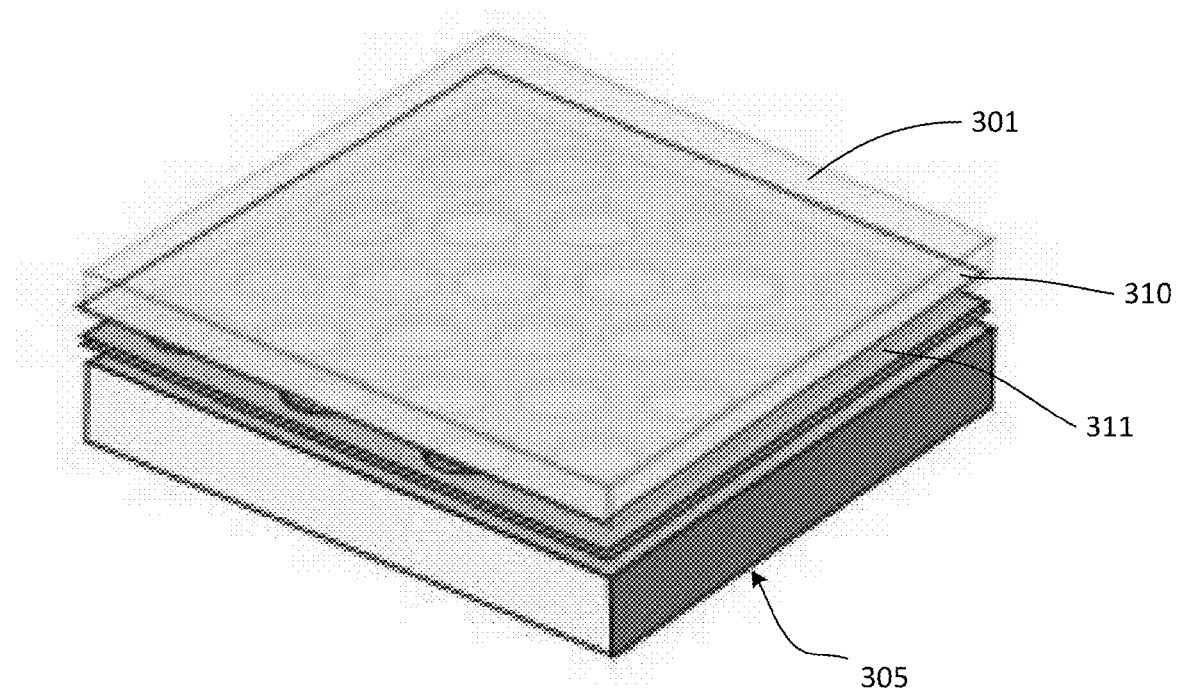
FIG. 7 shows an example of an assembled display of FIG. 6.

In some implementations, a micro-perforated layer of film may be applied to allow sufficient light from the LCD to pass through while preventing external light sources from illuminating the LCD source. FIG. 6 shows in an example of an exploded view of elements of a display including a micro-perforated layer prior to assembly. FIG. 7 shows a perspective view of the elements of FIG. 6 in an assembled form. The display 300 includes a protective cover 301, a white or grey diffusion layer 310, a perforated layer 311 and an LCD 305. The perforated layer 311 may be an opaque layer of film or ink with small patterned holes. In some implementations, the perforated layer may also be a diffusion layer.

The patterned holes may be of any size suitable for transmitting the backlight from the LCD while preventing the ambient light from illuminating the LCD source. For example, each hole may be about 0.03 mm in diameter, and the distance between the centers of adjacent holes may be about 0.06 mm. The patterned holes may be produced by laser etching or chemical etching, for example, on a layer of a material such as reflective Mylar, metal, plastic, or the like. The white or grey layer 310 diffusion may be laminated or printed on one or more solid semi-visible light transparent regions of the perforated layer 311 that represent a cosmetic surface 312, that is, the surface of the perforated layer 311 facing away from the LCD 305.

Figure 8:
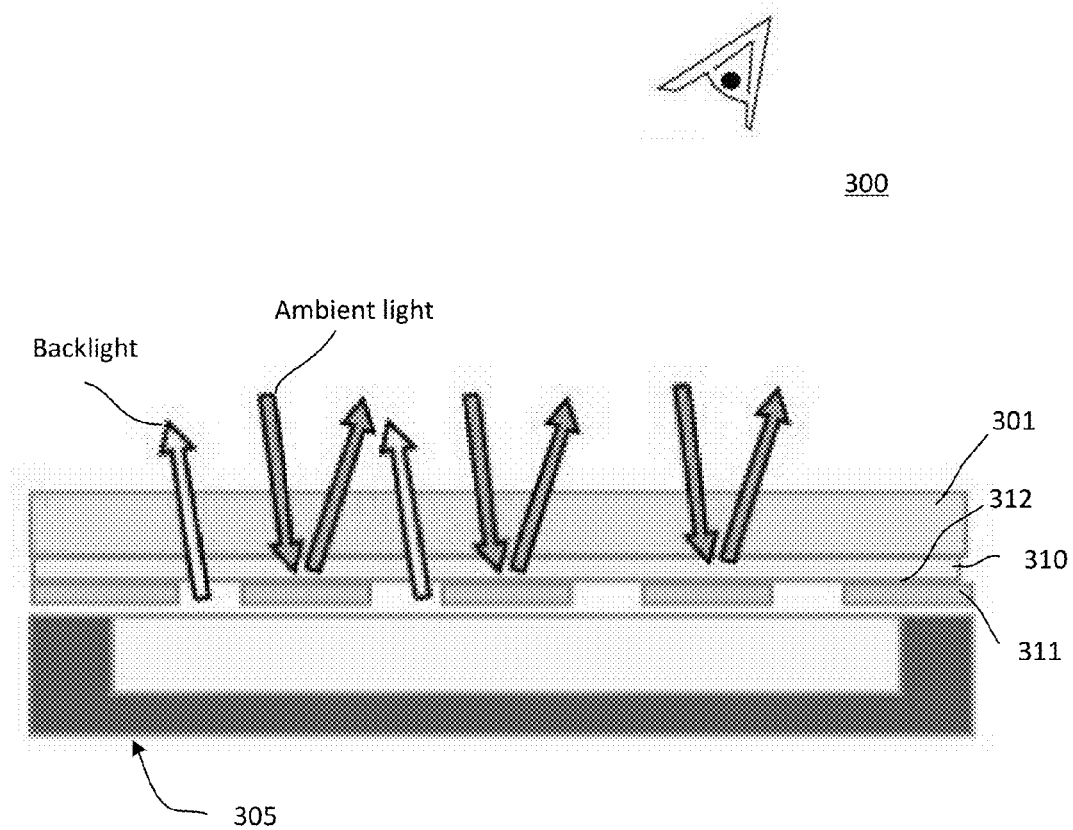
FIG. 8 shows an example of reflection of ambient light and scattering of transmitted backlight through the perforated layer in the assembled display of FIG. 7.

FIG. 8 shows an example of transmission and reflection of light rays in the operation of the display arrangement illustrated in FIGS. 6 and 7. As illustrated, ambient light is blocked or reflected off the non-perforated areas of the perforated layer 311 and thus prevented from reaching the LCD source 305. The perforated areas of the perforated layer 311 allow the light rays emitted from the backlight of the LCD 305 to be transferred to the cosmetic surface 312 of the perforated layer 311. This allows for sharp images with relatively strong contrasts to be projected through to the surface visible to the user.

By way of example and not by way of limitation, it is within the scope of the disclosed subject matter to provide one or more additional layers of one or more materials that can improve the "deadness" of the non-black dead front display when the LCD display is inactive, while also promoting or at least preserving the visibility, crispness, or color performance of the non-black dead front display when the LCD display is active. In some implementations, a layer of polarizing material may be disposed between the diffusing film layer and the LCD display. Because the polarizing layer only allows light rays of a given polarity to pass through while reflecting light rays of a polarity that is orthogonal to the given polarity, the visual whiteness or deadness of the device is enhanced when the LCD is in the inactive state, because a greater percentage of the incident light from outside the device is reflected back outward to the diffusing film. That reflected light is then diffused again as it propagates in the outward direction. In some implementations, the diffusing film can be made much thinner without sacrificing the visual deadness effect when the LCD is in the inactive state, while at the same time the brightness, crispness, or color performance in the LCD-active state is promoted.

An implementation of the disclosed display assembly may be included in one or more devices that are part of a smart-home environment, such as a thermostat, alarm control panel, or the like, or part of an automotive environment such as automobile dashboards, or other implementations that may benefit from the user of a dead front display.

Figure 9:
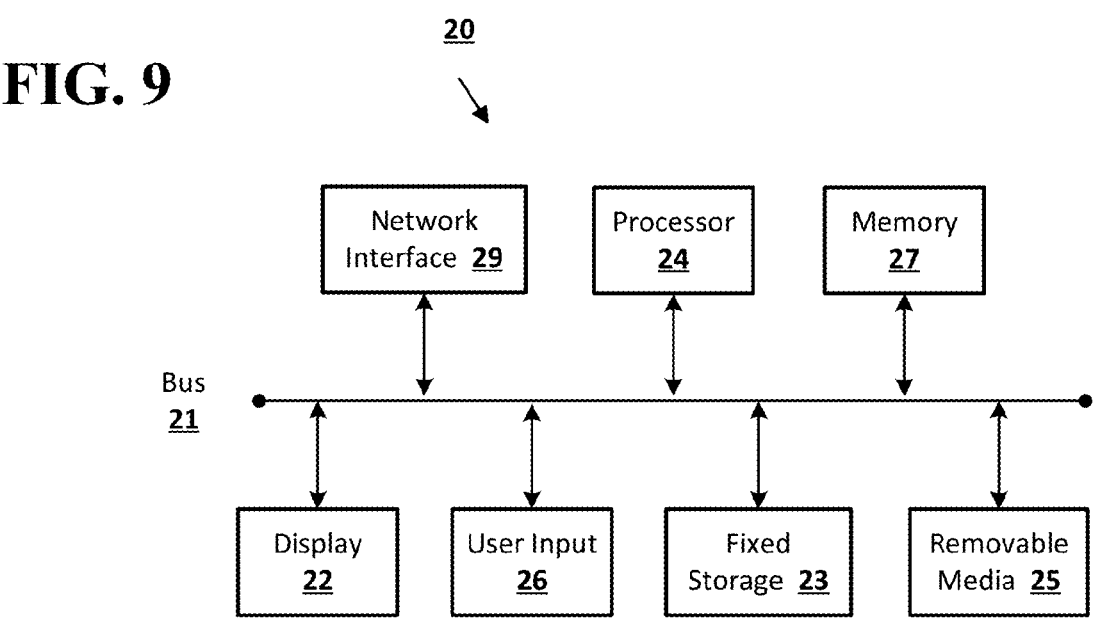
FIG. 9 shows an example of a device in which the display assembly may be implemented.

Embodiments of the presently disclosed subject matter may be implemented in and used with a variety of devices, for example, a device including the disclosed display assembly. FIG. 9 shows an example of a device 20 suitable for implementing embodiments of the presently disclosed subject matter. For example, the device 20 may be used to implement a controller, a device including sensors such as temperature sensors or alarm sensors in the smart-home environment as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen having a non-black dead front display effect, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Various embodiments also may be implemented in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A non-black dead front display assembly, comprising:
   a display frame;
   a backlight system supported by the frame, the backlight system configured to generate a backlight illumination;
   a light mask disposed on the backlight system, the light mask including an array of liquid crystal pixels wherein individual pixels may either block or transmit incident rays from the backlight system to appear either opaque or transparent in response to control signals; and
   a film positioned over the light mask and in direct contact with the light mask, the film configured to reflect ambient light and to scatter the backlight illumination transmitted through the light mask, the scattered backlight illumination causing a first portion of the film to glow while a second portion of the film appears non-glowing.

2. The display assembly of claim 1, wherein the film comprises a substantially white film, such that the display assembly appears a substantially uniform non-glowing white on the second portion of the film that reflects the ambient light.

3. The display assembly of claim 1, wherein the film comprises a substantially grey film, such that the display assembly appears a substantially uniform non-glowing grey on the second portion of the film that reflects the ambient light.

4. The display assembly of claim 1, further comprising a protective layer disposed on the film, the protective layer configured to pass the reflected ambient light and the scattered backlight illumination from the film.

5. The display assembly of claim 4, wherein the protective layer comprises a material selected from the group consisting of plastic, glass, ceramic and polymethyl methacrylate.

6. The display assembly of claim 1, wherein the display frame, the backlight system and the light mask are included in a liquid crystal display (LCD).

7. The display assembly of claim 6, wherein the LCD comprises a monochrome LCD.

8. The display assembly of claim 6, wherein the LCD display comprises a color LCD.

9. The display assembly of claim 1, further comprising a perforated film positioned over the light mask, the perforated film having at least one hole that allows the backlight illumination to pass through.

10. A device, comprising:
    a sensor; and
    a non-black dead front display assembly comprising:
      a display frame;
      a backlight system supported by the frame, the backlight system configured to generate a backlight illumination;
      a light mask disposed on the backlight system, the light mask including an array of liquid crystal pixels wherein individual pixels may either block or transmit incident rays from the backlight system to appear either opaque or transparent in response to control signals; and
      a film positioned over the light mask and in direct contact with the light mask, the film configured to reflect an ambient light and to scatter the backlight illumination transmitted through the light mask, the scattered backlight illumination causing a first portion of the film to glow while a second portion of the film appears non-glowing.

11. The device of claim 10, wherein the film comprises a substantially white film, such that the display assembly appears a substantially uniform non-glowing white on the second portion of the film that reflects the ambient light.

12. The device of claim 10, wherein the film comprises a substantially grey film, such that the display assembly appears a substantially uniform non-glowing grey on the second portion of the film that reflects the ambient light.

13. The device of claim 10, wherein the non-black dead front display assembly further comprises a protective layer disposed on the film, the protective layer configured to pass the reflected ambient light and the scattered backlight illumination from the film.

14. The device of claim 13, wherein the protective layer comprises a material selected from the group consisting of plastic, glass, ceramic and polymethyl methacrylate.

15. The device of claim 10, wherein the display frame, the backlight system and the light mask are included in a liquid crystal display (LCD).

16. The device of claim 15, wherein the LCD comprises a monochrome LCD.

17. The device of claim 15, wherein the LCD comprises a color LCD.

18. The device of claim 10, wherein the non-black dead front display assembly further comprises a perforated film positioned over the light mask, the perforated film having at least one hole that allows the backlight illumination to pass through.

19. The device of claim 10, wherein the sensor comprises a temperature sensor.

20. The device of claim 10, wherein the sensor comprises an alarm sensor.

21. The display assembly of claim 1, further comprising a mechanical structure to bias the film against the light mask.

* * * * *